Sept. 21, 1965 J. A. BAGNALL ETAL 3,207,875
THERMAL TIME DELAY RELAY FOR SWITCHING AND PROTECTING
START AND PHASE WINDINGS OF MOTORS
Filed July 29, 1959 7 Sheets-Sheet 1

Inventors;
James A. Bagnall,
Walter H. Moksu,
by Harold Levine
Att'y.

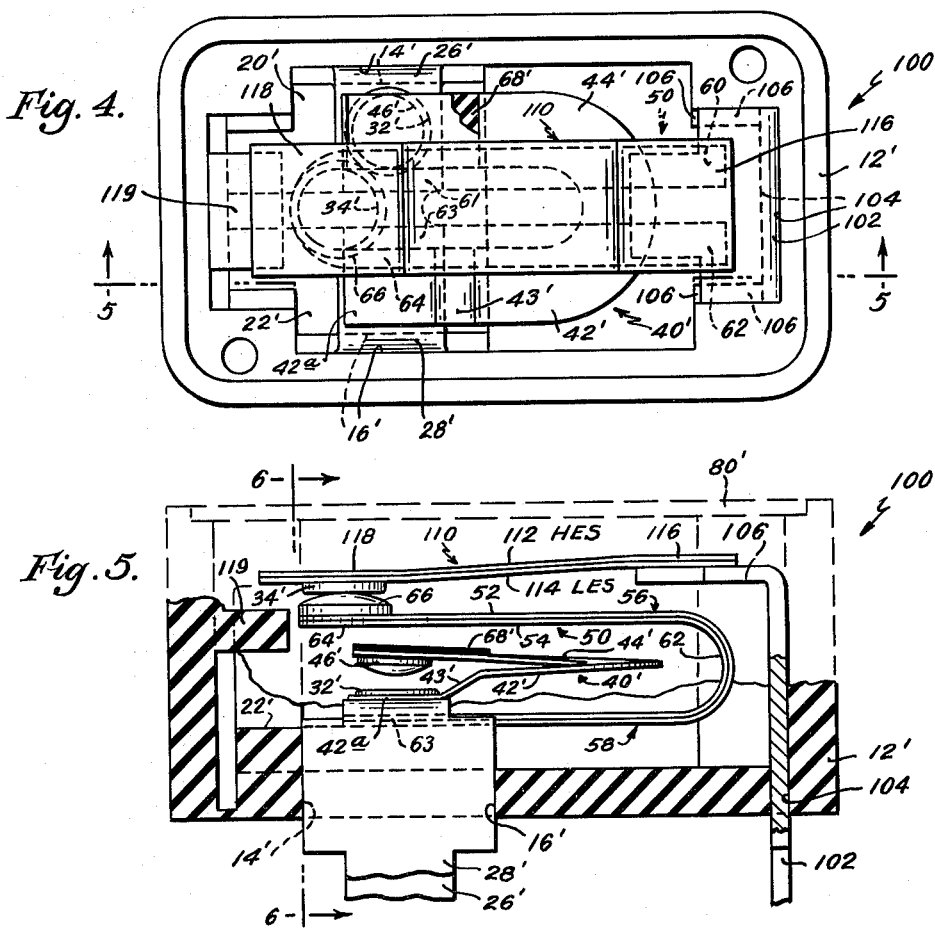
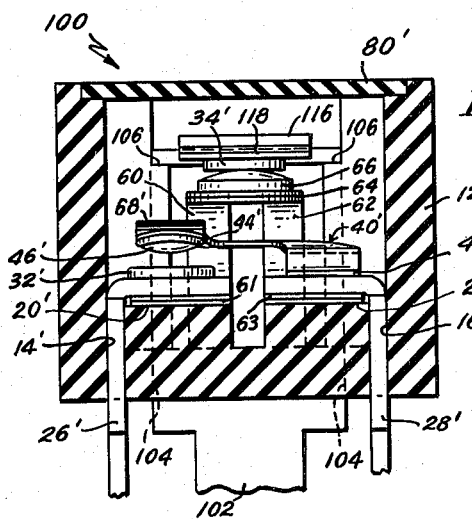
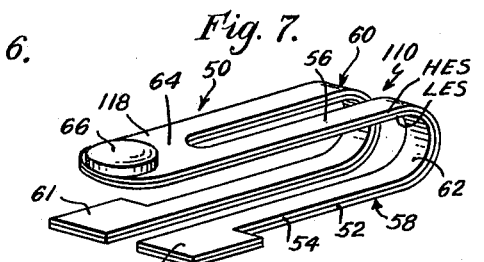
Inventors;
James A. Bagnall,
Walter H. Moksu,
by Harold Levine
Atty.

Inventors;
James A. Bagnall,
Walter H. Moksu,
by Harold Levine Att'y.

Inventors;
James A. Bagnall,
Walter H. Moksu,
by Harold Levine
Att'y.

Inventors;
James A. Bagnall,
Walter H. Moksu,
by Harold Levine Att'y.

Inventors;
James A. Bagnall,
Walter H. Moksu,
by Harold Levine
Att'y.

United States Patent Office 3,207,875
Patented Sept. 21, 1965

3,207,875
THERMAL TIME DELAY RELAY FOR SWITCHING AND PROTECTING START AND PHASE WINDINGS OF MOTORS
James A. Bagnall, Dearborn, Mich., and Walter H. Moksu, Attleboro, Mass., assignors to Texas Instruments Incorporated, Dallas, Tex., a corporation of Delaware
Filed July 29, 1959, Ser. No. 830,407
5 Claim. (Cl. 200—113)

This invention relates to thermal protective devices, and more particularly, to thermal time-delay relays. The relays of the instant invention are especially suited for, though not limited to, switching and protecting the start or phase windings of split-phase electric motors. The start or phase winding is generally of a fine high-resistance wire and generally can withstand continuous operation for only a short time. It is, therefore, important that a protective device for a split-phase motor should not permit the start winding to be subjected to currents for a damaging length of time or those which are excessively high. The start winding relay must be effective to de-energize the start winding in the short time specified for the particular motor, and make it impossible for the start winding to become re-energized at an improper time.

It is one object of the invention to provide a thermal time-delay relay which will accomplish the above objectives.

It is another object to provide a thermal time-delay relay which is adapted for miniaturization, is simple and inexpensive to manufacture and yet dependable in the performance of its functions.

It is another object of the invention to provide a relay which is especially applicable for protecting and switching the phase or start winding of fractional horsepower electric motors, such as are employed, for example, in refrigeration installations, electrical appliances, e.g., washing machines, electric dryers, etc., and business machines, e.g., electric typewriters and calculators, etc.

It is another object to provide a thermal relay which employs an electrically conducting thermostatic element which is self-protecting and is operative to shunt itself out to prevent overheating thereof.

It is another object to provide a thermal relay for the purposes described, the operation of which is relatively independent of the embient temperature.

Among the further objects of the instant invention are the provisions of a thermal time-delay relay which is durable, accurate, reliable in operation, compact; and which is versatile and susceptible to varying electrical ratings and diverse applications; which embodies a minimum number of parts; and which is simple and economical to assemble and manufacture.

It is another object to provide a thermal time-delay relay for the purposes described which affords a quick reset.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

FIG. 4 is a top plan view, with cover removed, of a thermal relay according to another embodiment of the instant invention;

FIG. 5 is a sectional view, with parts of the casing broken away, taken substantially on line 5—5 of FIG. 4, which follows the inner edge of the casing;

FIG. 6 is a sectional view taken on line 6—6 of FIG. 5;

FIG. 7 is a perspective view of a thermostatic bimetal element common to each of the species of FIGS. 1-3, 4-6, 8 and 9, and 15-18;

Figure 8:
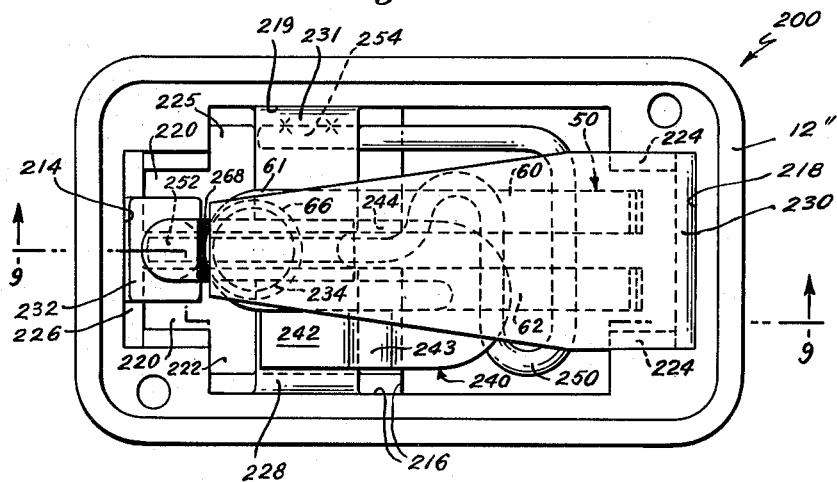
FIG. 8 is a top plan view, with cover removed, of another thermal relay according to yet another embodiment of the instant invention.
Figure 9:
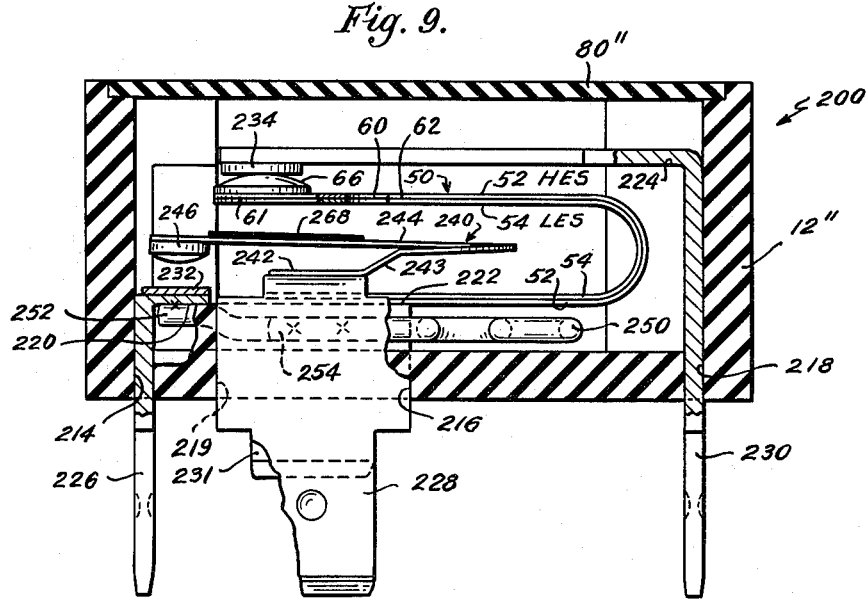
FIG. 9 is a sectional view taken substantially on line 9—9 of FIG. 8.
Figure 19:
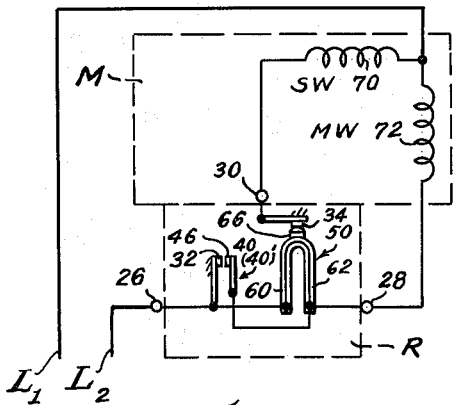
FIGS. 19 and 20 are wiring diagrams for the relay illustrated in FIGS. 1-3 and 15-18 in combination with a split-phase electric motor.
Figure 20:
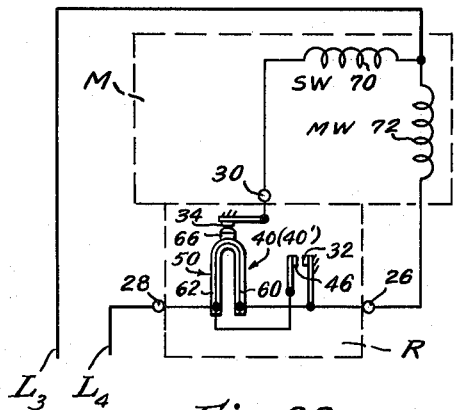
Figure 23:
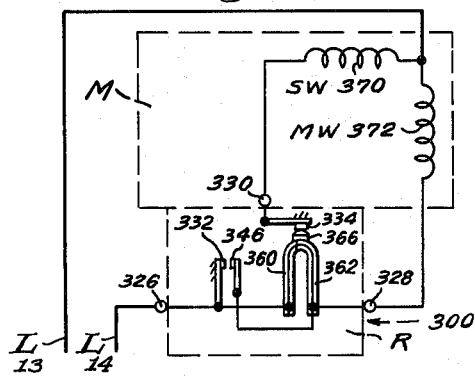
Figure 24:
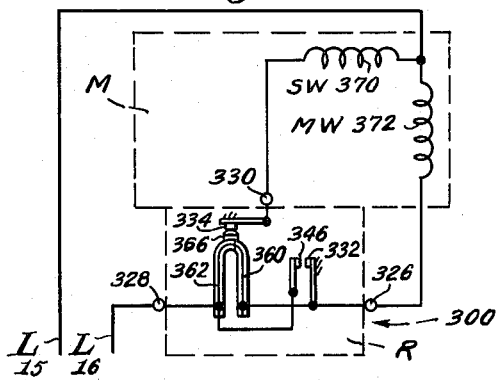
Figure 25:
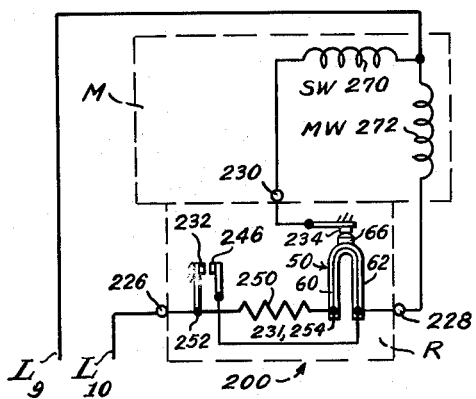
Figure 26:
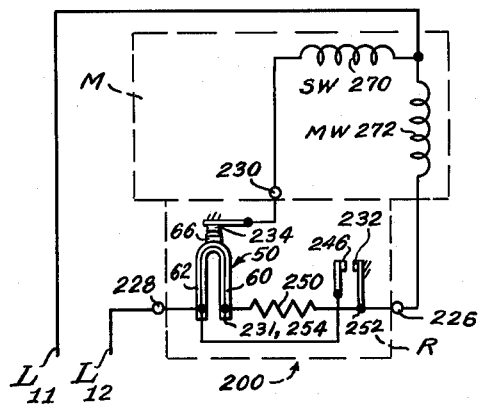

FIGS. 23 and 24 are wiring diagrams similar to FIGS. 19 and 20 for the thermal relay illustrated in FIGS. 10-14; and FIGS. 25 and 26 are wiring diagrams similar to FIGS. 19 and 20 for the relay illustrated in FIGS. 8 and 9.

Dimensions of certain of the parts as shown in the drawing have been modified for the purposes of clarity of illustration.

Figure 1:
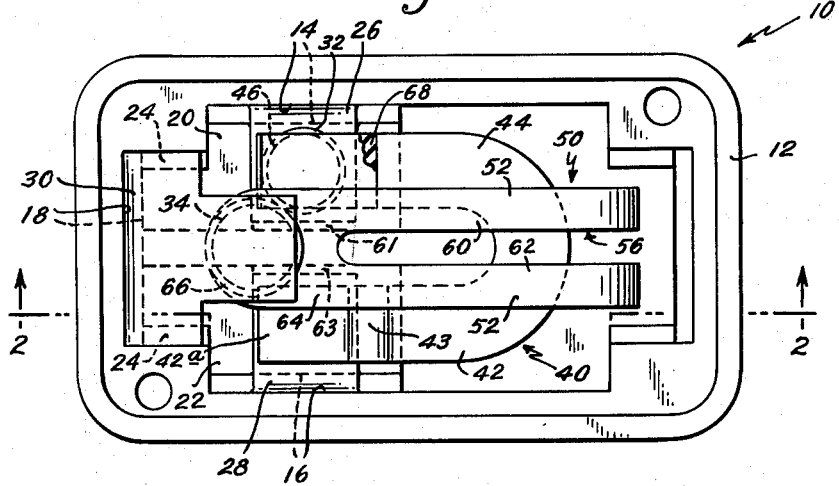
FIG. 1 is a top plan view, with cover removed of a thermal relay according to a first embodiment of the instant invention.
Figure 2:
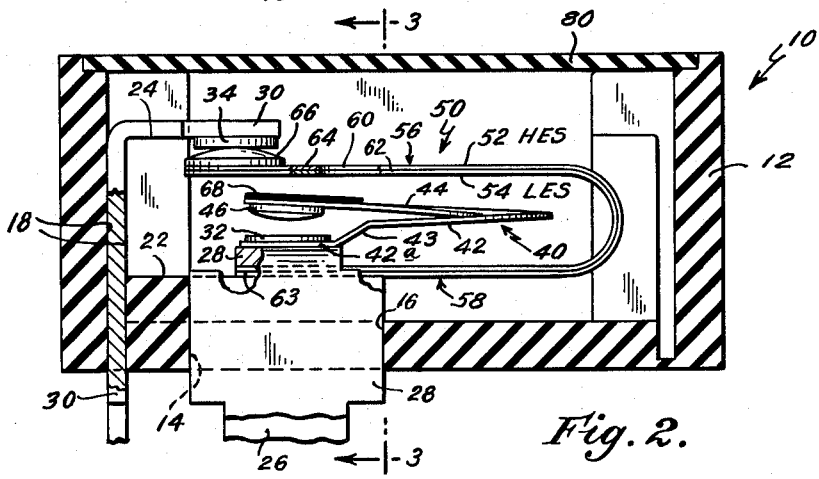
FIG. 2 is a sectional view taken substantially on line 2—2 of FIG. 1 which follows the inner edge of the casing.
Figure 3:
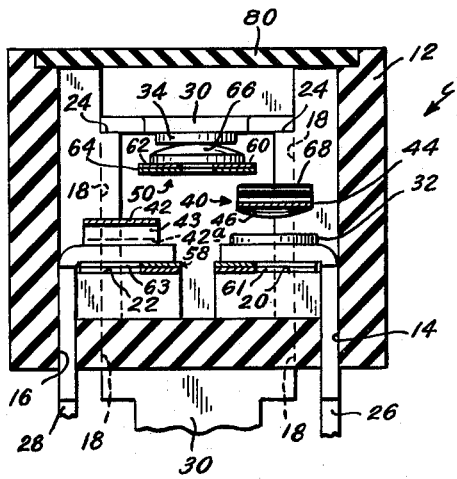
FIG. 3 is a sectional view taken on line 3—3 of FIG. 2.

Referring now to the drawings, there is illustrated, in FIGS. 1-3, a thermal time-delay relay according to a first embodiment of the instant invention, generally referred to by numeral 10. Thermal relay 10 includes a casing member 12 formed of one of the conventional electrically insulating plastics such as a moldable, phenolic, resinous material. Casing member 12 is provided with a plurality of vertically open-ended slots 14, 16 and 18 opening exteriorly of casing member 12 (as best seen in FIGS. 2 and 3) and a plurality of shoulders 20, 22 and 24 adjacent thereto, which co-operatively interfit with and mount respectively, electrically conductive terminals 26, 28 and 30. Terminal 26 is provided with a stationary electrical contact 32 fixedly mounted on and electrically connected to the upper surface thereof. Terminal 30 mounts a fixed electrical contact 34, which is electrically connected thereto as shown.

Thermal relay 10 includes an electrically conducting switch means or shunt means generally indicated at 40 comprising a U-shaped member (as seen in top plan in FIG. 1) having one leg 42 electrically connected, as at 42a, to terminal 28 and its other leg 44 carrying an electrical contact 46 for movement into and out of engagement with contact 32 for a purpose later to be described.

Contacts 32 and 46 are normally open. Electrical switch or shunt means 40 may be formed of a conventional, electrically conducting material such as a beryllium copper alloy or a phosphor bronze alloy. Leg 42 has a bent portion 43 which co-operates in spring biasing leg 44 to maintain contact 46 normally out of engagement with contact 32.

Thermal relay 10 is further provided with a thermally responsive member generally indicated at 50 which may be formed of a conventional, thermostatic material such as bimetal formed of two layers 52 and 54 having unequal coefficients of thermal expansion, with layer 52 having the higher coefficient of expansion. Layers 52 and 54, which are respectively the high and low expansion layers, are respectively represented on the drawing by HES and LES. The bimetal element, as shown in perspective in FIG. 7, is common to each of the embodiments of the thermal relay shown in FIGS. 1–3, 4–6, 8, 9 and 15–18. Bimetal element 50 is U-shaped in elevation, as seen in FIGS. 2 and 7, and includes upper and lower portions indicated generally by numerals 56 and 58. Bimetal element 50 is also substantially U-shaped, as seen in plan view in FIG. 1, and includes legs 60 and 62, as best seen in FIGS. 1, 3 and 7. Leg 62 is electrically connected at one end 63 to terminal 28, at the lower side thereof, and rests on shoulder 22 of casing 12, as best seen in FIG. 3. One end 61 of leg 60 is electrically connected to terminal 26 at the lower side thereof and rests on shoulder 20 of casing 12, as best seen in FIG. 3. The other ends of each of legs 60 and 62 meet at an intermediate or bight portion 64. Contact 66 is electrically connected to and carried by intermediate portion 64 of bimetal element 50 at the upper surface thereof, for movement into and out of engagement with contact 34 in response to movement of bimetal element 50 at predetermined temperature and current conditions. Contacts 34 and 66 are normally closed, and as will be discussed more fully below, are generally the start contacts in a circuit for switching and protection of the start or phase winding of a split-phase electric motor. After contacts 34 and 66 are opened by the movement of bimetal element 50, the lower surface of intermediate portion 64 is adapted to engage shunt member 40 to close contacts 32 and 46 upon further movement of bimetal element 50.

Switch means or shunt means 40 is provided with a layer of electrical insulation 68 along a portion of its top surface directly beneath the lower surface of the intermediate or bight portion 64 of bimetal element 50, as clearly shown in FIG. 2.

In practice, terminals 28 and 26, shunt or switch means 40, bimetal element 50, contact 66 and contacts 32 and 46 are preassembled as a subassembly and is slidably inserted into casing 12, after which terminal 30, carrying contact 34, is slidably inserted into slot 18 of casing 12 and securely fastened in place by staking or other means (not shown). Thereafter, the open end of the casing is closed with a cover member 80 and is secured to casing member 12, in any convenient known manner, such as by gluing, bolting, etc. (not shown).

The thermal relay thus far described, as illustrated in FIGS. 1–3, is especially adapted for use as a switching and protective device for a split-phase electrical motor having an auxiliary phase winding or a start winding and a main winding.

Referring now to the circuit diagrams of FIGS. 19 and 20, the thermal relay is schematically illustrated in circuits with a motor having an auxiliary start or phase winding 70 and main winding 72.

Referring now specifically to FIG. 19, terminal 26 of thermal relay 10 is electrically connected to $L_2$, one side of a power source. Terminal 30 is electrically connected in series with start or phase winding 70 and terminal 28 is electrically connected in series with main winding 72. Normally closed start contacts 34 and 66 are electrically connected in series with start winding 70 through terminal 30. Legs 60 and 62 of bimetal member 50 are connected in series with the main winding 72 through terminal 28, and normally open shunting contacts 32 and 46 are connected in shunt across legs 60 and 62 and thus shunt contacts 32 and 46 are also connected in series with main winding 72 through terminal 28. As shown in FIG. 19, the bimetal element 50 carries both the start and main winding currents when start contacts 34 and 66 are closed. In this condition, leg 60 of bimetal element 50 carries both the start and main winding current and leg 62 carries only the main winding current. When start contacts 34 and 66 are separated and shunt contacts 32 and 46 are open, both legs of bimetal element 50 will carry only main winding current.

Referring now to FIG. 20, terminal 28 is electrically connected to $L_4$, one side of a power source. Terminal 30 is connected in series with the start winding 70 and terminal 26 is connected in series with main winding 72. In the circuit of FIG. 20, bimetal element 50 carries both the main and start winding currents as in the circuit of FIG. 19; however, leg 62 of bimetal element 50 now carries both the start and main winding currents and leg 60 carries only the main winding current when start contacts 34 and 66 are closed. Legs 60 and 62 of bimetal member 50 are connected in series with main winding 72 through terminal 26 and normally open shunting contacts 32 and 46 are connected in shunt across leg 60 and 62 and thus shunt contacts 32 and 46 are also connected in series with main winding 72 through terminal 26. Normally closed contacts 34 and 66 are electrically connected in series with start winding 70 through terminal 30.

The operation of thermal relay 10 is substantially as follows. When the circuit is energized, the bimetal element 50 will be heated by both the start and main winding currents and as the motor comes up to speed, the bimetal element 50 will move downwardly (as viewed in FIG. 2) in response to the heat derived from the start and main winding current so as to open normally closed contacts 34 and 66 and thereby de-energize the start winding within the required very short time as the motor comes up to speed. Thereafter, the bimetal is further heated by the continued main winding current therethrough and will continue to move downwardly as best seen in FIG. 2. As bimetal element 50 continues to move downwardly, it moves into engagement with the insulated portion 68 of shunt member 40 and urges normally open contacts 32 and 46 into engagement to shunt out and thereby protect bimetal element 50 from overheating. After shunt contacts 32 and 46 are closed, thereby shunting the main winding current out of the bimetal element 50, bimetal element 50 will cool, move upwardly as seen in FIG. 2 and permit shunting contacts 32 and 46 to open under the spring bias of leg 44 of shunt means 40, and thereby cause the main winding current to again flow through the bimetal element and result in further heating thereof. This further heating causes bimetal element 50 to move in a direction to close shunt contacts 46 and 32, before the bimetal element 50 has cooled and moved upwardly sufficiently (as viewed in FIG. 2) to close start contacts 34 and 66. This cyclic action continues as long as the motor is energized. Shunting contacts 32 and 46, in cycling between a contacts-open and -closed position while start contacts 34 and 66 are open, are effective to maintain thermally responsive means 50 at a lower temperature, which is slightly above the reset temperature of the device (that is that temperature at which thermally responsive means 50 will cause or permit closing of start contacts 66 and 34 to re-energize the start winding). The shunting contacts 46 and 32, by co-operating with thermally responsive means 50 to maintain the latter at this lower temperature, advantageously afford a quick reset of the device.

Thus it is seen, from the above, that bimetal element 50 is effective to de-energize the start winding and is also effective to protect itself from overheating and maintain itself at a temperature just slightly above the reset temperature while the motor is energized by cyclically causing shunt contacts 32 and 46 to close and to shunt the main winding current out of bimetal element 50, as described above. Once having opened the start contacts 34 and 66, bimetal element 50 will maintain the start contacts 34 and 66 open while current flows through the main winding and will hunt between a position in which both start contacts 34 and 66 and shunt contacts 32 and 46 are open and a position in which start contacts 34 and 66 are open and shunt contacts 32 and 46 are closed.

In the event that there is an oxide film between shunting contacts 32 and 46 which prevents effective shunting of bimetal element 50, the latter will, in this condition, continue to bear and push harder against shunt member 40 (as best seen in FIG. 3). Since the point of application of the force of the bimetal element 50, in pushing against the shunt member 40, is eccentric with respect to the contacts 32 and 46 (as seen in FIG. 3), rotation of contact 46 with respect to contact 32 will occur upon the application of additional pushing force by bimetal 50. This rotation is effective to break apart barrier oxide films which may have formed between the shunting contacts and thus advantageously provides a wiping contacts cleaning action.

Thermal relay 10, as well as the remaining thermal relay embodiments to be described below, can be constructed so as to provide a quick reset of the start contacts by calibrating the bimetal element for a high operating temperature so that the bimetal element will cool quickly and afford a quick reset. By calibrating the bimetal element 50 for a high operating temperature, the operation of the relay is thereby made relatively independent of minor changes in ambient temperature. The bimetal element 50 being U-shaped, as best seen in FIG. 2 (as defined by portions 56 and 58), affords the advantageous result of permitting a much smaller constructed switch and provides substantially greater thermal activity than that which could be obtained with a bimetal element in a straight cantilever or strip form in the same size miniaturized switch. A cantilever bimetal strip providing the same thermal activity as that of U-shaped bimetal element 50 would require a switch structure of a size substantially greater than that required for the U-shaped bimetal element 50.

Another advantage of the U-shaped bimetal element 50 over a cantilever strip bimetal element of the same length is that the former provides the same electrical resistance as the latter but can be employed in a much smaller, miniaturized switch construction.

The shunt or switching element 40, because of its U-shape, also permits miniaturization of the switch and is more sensitive and responsive to movement of the bimetal element 50 and requires little or minimum thermal force of movement by the bimetal to cause shunting or closing of normally open contacts 32 and 46. The combined lengths of legs 42 and 44 provide a long fulcrum arm about the fulcrum point at the connection of leg 42 to terminal 28 so as to permit a minimum force by the bimetal contact therewith to cause movement of the shunt arm.

From the above, it is clear that thermal relay 10 provides a miniaturized, simply constructed, lowcost device with a minimum number of parts, which is reliable in operation and with the bimetal serving the dual function of de-energizing the start windings and of self-protection from overheating by main winding currents and maintaining its temperature just slightly above the reset temperature when the motor is energized by shunting itself out, as described above.

Illustrated in FIGS. 4–6, 21 and 22 is another embodiment of the thermal relay of the instant invention. Thermal relay 100, as illustrated in FIGS. 4–6, is similar to the thermal relay illustrated in FIGS. 1–3 and includes parts which are or may be substantially identical with corresponding parts of the thermal relay shown in FIGS. 1–3. In this regard, those parts of the thermal relay 100 as shown in FIGS. 4–6, which have the same (or primed) reference numerals, as shown in FIGS. 1–3, are substantially identical with their respective counterparts in FIGS. 1–3, except as pointed out hereinafter. It will be understood that the broken-away portions of the thermal relay as shown in FIG. 5 is or may be of the same form as that of the portions included in the thermal relay shown in FIG. 2.

Thermal relay 100 is provided with a casing 12', a cover member 80', and terminals 26' and 28' mounted respectively in slots 14' and 16' and shoulders 20' and 22' provided by casing 12'. Terminal 26' is provided with an electrical contact 32'. Thermal relay 100 also includes an electrically conducting, U-shaped switch means or shunt means 40' electrically connected and mounted at one end 42a to terminal 28' and carrying an electrical contact 46' for engagement with contact 32', which contacts 32' and 46' comprise a pair of normally open shunt contacts. Shunt or switch means 40' is also provided with electrically insulating layer 68', as clearly shown in FIG. 5. Thermal relay 100 is further provided with the same thermally responsive member 50 as that described above in the embodiment of FIGS. 1–3 and includes a start contact 66, as shown. As described above, layer 52 of U-shaped bimetal element 50 is the high-expansion layer, as represented by HES on the drawing.

Thermal relay 100 further includes an electrically conducting terminal 102 which is mounted in casing 12' by means of an open-ended slot 104 opening exteriorly of casing member 12' and shoulders 106, which shoulders serve the same function as shoulders 20' and 22'. Fixedly mounted and electrically connected to the upper surface of terminal 102 (as best seen in FIG. 5) is a thermally responsive, ambient compensating contact-carrying element generally referred to as 110. Element 110 may be formed of a conventional thermostatic material such as bimetal, formed of two layers 112 and 114, having unequal coefficients of thermal expansion, with layer 112 being the high-expansion layer as represented by HES on the drawing, and layer 114 the low-expansion layer (LES). Element 110 has an electrical resistance which is less than that of bimetal element 50, with the result that the bimetal is practically thermally unaffected by current flowing therethrough. Bimetal element 110 is secured at one end 116 to terminal 102 and carries adjacent its other end an electrical contact 34' for engagement with contact 66 carried by bimetal element 50. Portion 118 of bimetal element 110 which extends beyond electrical contact 34' is adapted to engage stop 119 provided by casing 12', as best seen in FIG. 5, to assure that at extremely high ambient temperatures, start contacts 34' and 66 will separate before shunt contacts 46' and 32' are closed.

In practice, the thermal relay 100 may be preassembled into a subassembly and assembled in the same manner as that described above for thermal relay 10.

Figure 21:
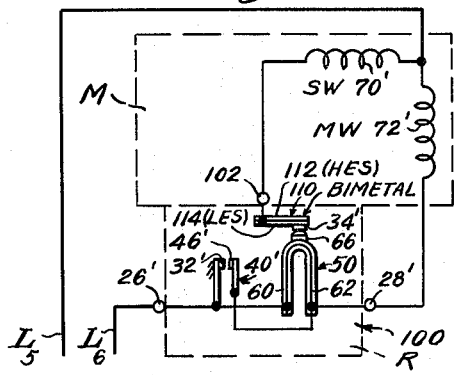
FIGS. 21 and 22 are wiring diagrams similar to FIGS. 19 and 20 for the thermal relay illustrated in FIGS. 4-7.
Figure 22:
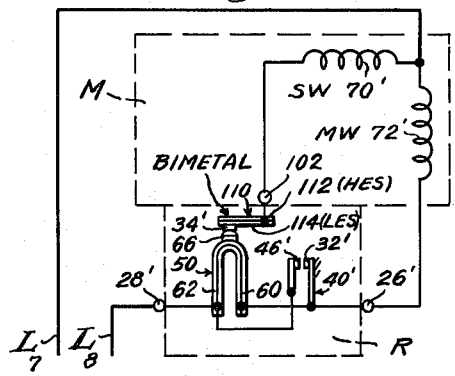

Referring now to the circuit diagrams of FIGS. 21 and 22, the thermal relay 100 is schematically illustrated in a circuit with a motor having an auxiliary or phase winding 70' and a main winding 72'.

Referring now specifically to FIG. 21, terminal 26' of thermal relay 100 is electrically connected to $L_6$, one side of a power source. Terminal 102 is electrically connected in series with start or phase winding 70' and terminal 28' is electrically connected in series with main winding 72'. Normally closed start contacts 34' and 66 are electrically connected in series with start winding 70' through ambient compensating member 110 and terminal 102. Legs 60 and 62 of bimetal member 50 are connected in series with the main winding 72' through terminal 28' and normally open shunting contacts 32' and 46' are connected in shunt across legs 60 and 62 and thus shunt contacts 32' and 46' are also connected in series with main winding 72' through terminal 28'. As shown in FIG. 21, the bimetal element 50 carries both the start and main winding current. Leg 60 of bimetal element 50, as in the species shown in the circuit of FIG. 19, carries both the start and main winding current and leg 62 carries only the main winding current when the start contacts 34' and 66 are closed. When start contacts 34' and 66 are separated and shunt contacts 32' and 46' are open, both legs 62 and 60 of bimetal element 50 will carry the main winding or line current.

Referring now to FIG. 22, terminal 28' is electrically connected to $L_8$, one side of a power source. Terminal 102 is connected in series with start winding 70' and terminal 26' is connected in series with main winding 72'. In the circuit of FIG. 22, when the start contacts 34' and 66 are closed, bimetal element 50 carries both the main and start winding currents, as in the circuit of FIG. 21; however, leg 62 of bimetal element 50 carries both the start and main winding current and leg 60 carries only the main winding current. Bimetal element 50 and normally open shunt contacts 32' and 46' are electrically connected in parallel to each other and in series with main winding 72' through terminal 26'. Normally closed contacts 34' and 66 are electrically connected in series with start winding 70' through ambient compensating bimetal member 110 and terminal 102. The operation of thermal relay 100 in each of these circuits is substantially the same as that described for thermal relay 10 above, except as noted below. Thermal relay 100 additionally has the advantage of an ambient compensating bimetal contact carrier 110 for start contact 34'. The bimetal strip 110 is effective to vary the position of contact 34' with changes in ambient temperature so that the bimetallic element 50 will open the starting circuit switch in the same time period regardless of the ambient temperature. The bimetal strip 110 is adapted to flex in the same direction as bimetal member 50 on changes in ambient temperature. Since bimetal strip 110 is practically unaffected by current flowing therethrough, relative movement between bimetal element 50 and bimetallic strip 110 to open the start contacts 34' and 66 is effected only by the current passing through bimetal element 50. The ambient compensating bimetal contact carrier 110 is particularly advantageous with relays having low operating temperatures. Thermal relay 100 additionally provides substantially all of the unusual and advantages beneficial results described above for thermal relay 10.

Illustrated in FIGS. 8, 9, 23 and 24 is another embodiment of the thermal relay of the instant invention. Thermal relay 200, as illustrated in FIGS. 8 and 9, is similar to the thermal relay illustrated in FIGS. 1–3 and includes parts which are or may be substantially identical with corresponding parts of the thermal relay shown in FIGS. 1–3. In this regard, those parts of the relay 200 as shown in FIGS. 8 and 9, which have the same (or double primed) reference numerals as shown in FIGS. 1–3, are substantially identical with their respective counterparts of FIGS. 1–3 except as pointed out hereinafter. Thermal relay 200 is provided with a casing 12" and a cover member 80". Casing member 12" is provided with a plurality of vertically open-ended slots 214, 216, 218 and 219, opening exteriorly of casing member 12" (as best seen in FIG. 9), and a plurality of shoulders 220, 222, 224 and 225 adjacent thereto, which co-operatively interfit with and mount respectively, electrically conductive terminals 226, 228, 230 and 231. Terminal 226 is provided with a stationary electrical contact 232 fixedly mounted and electrically connected to the upper surface thereof. Terminal 230 mounts a fixed electrical contact 234 at its extreme end portion at the lower surface thereof, as best seen in FIG. 9. Thermal relay 200 includes an electrically conductive switch means or shunt means generally indicated at 240 which is substantially similar to switch or shunt means 40 of the thermal relay illustrated in FIGS. 1–3. Switch or shunt means 240 comprises a U-shaped member (as seen in top plan in FIG. 8) having one leg 242 electrically connected to terminal 228 and its other leg 244 carrying an electrical contact 246 thereon for movement therewith, into and out of engagement with contact 232. Contacts 232 and 246 comprise a pair of normally open shunt contacts corresponding to shunt contacts 32 and 46 of thermal relay 10. Leg 242 has a bent portion 243 which co-operates in spring biasing leg 244 to maintain contact 246 normally out of engagement with contact 232. Switch means or shunt means 240 is provided with a layer of electrical insulation 268 along a portion of its top surface, as shown in FIG. 9, which is substantially for the same purpose as the layer of electrical insulation 68 of thermal relay 10.

Thermal relay 200 is further provided with the same thermally responsive member 50 as that described above in connection with thermal relay 10 shown in FIGS. 1–3 and includes start contact 66 as shown. As described above, layer 52 of U-shaped bimetal element 50 is the high-expansion layer as represented by HES on the drawing and layer 54 is the low-expansion side (LES). As described above, bimetal element 50 is substantially U-shaped, as seen in plan view in FIG. 8, and includes legs 60 and 62, as best seen in FIG. 8. Leg 62 is electrically connected at one end 63 to terminal 228 at the lower side thereof. One end 61 of leg 60 is electrically connected to stub or shortened terminal 231. The remainder of bimetal element 50, including the mounting or start contact 66, is identical to that described above for thermal relay 10.

Thermal relay 200 is further provided with an electrical heating means 250 which is electrically connected at one end 252 to terminal 226 and at its other end 254 to terminal 231. Terminal 231 comprises a stub or shortened terminal and provides a common connection of the bimetal element 50 to heater 250.

As shown in FIG. 9, heater 250 is positioned directly beneath thermal element 50 so as to be in good heat-transfer relation thereto. Heater 250 provides the advantages of enabling the construction of a low current rated relay and the heater assures that the start contacts, once broken, will not be closed until the main winding is de-energized by providing heat to the bimetal generated by the main winding current passing through the heater in addition to the heat generated by the internal resistance of the bimetal and the main winding current passing therethrough.

Referring now to the circuit diagram of FIGS. 25 and 26, thermal relay 200 is schematically illustrated in a circuit with a motor having an auxiliary or phase winding 270 and a main winding 272.

Referring now specifically to FIG. 25, terminal 226 of thermal relay 200 is electrically connected to $L_{10}$, one side of a power source. Terminal 230 is electrically connected in series with start or phase winding 270 and terminal 228 is electrically connected in series with main winding 272. Normally closed start contacts 234 and 66 are electrically connected in series with start winding 270 through terminal 230. Heater 250 and bimetal element 50 are connected in series with each other and in series with main winding 272 through terminal 228. Normally open shunting contacts 232 and 246 are connected in parallel with the series connected heater 250 and bimetal element 50 and thus are in series with main winding 272 through terminal 228. As shown in FIG. 25, when the start contacts 234 and 66 are closed, heater 250 and the bimetal element 50 carry both the start and main winding currents as shown with heater 250 and leg 60 of the bimetal element 50 carrying both the start and main winding currents while leg 62 of bimetal element 50 carries only the main winding current. When start contacts 234 and 66 are separated, and shunt contacts 232 and 246 are open, both legs 62 and 60 of bimetal element 50 and heater 250 will carry the main winding or line current.

Referring now to FIG. 26, terminal 228 is electrically connected to $L_{12}$, one side of a power source. Terminal 230 is connected in series with start winding 270 and terminal 226 is connected in series with main winding 272. In the circuit of FIG. 26, when start contacts 234 and 66 are closed, leg 62 of bimetal element 50 carries both the start and main winding currents and leg 60 and heater 250 carry only the main winding current. Legs 60 and 62 of bimetal member 50 and heater 250 are electrically connected in series with each other and in series with main winding 272 through terminal 226 and normally open shunting contacts 232 and 246 are connected in shunt across the series connected legs 60 and 62 of bimetal element 50 and heater 250 and thus shunting contacts 232 and 246 are connected in series with main winding 272 through terminal 226.

The operation of thermal relay 200, in each of these circuits, is substantially the same as that described above for thermal relay 10, except as noted below.

Thermal relay 200 provides substantially all of the unusual and advantageous beneficial results described above for thermal relay 10 and as pointed out above, heater 250 provides additional advantages not available in the thermal relay 10. The bimetal element 50, after separating start contacts 234 and 66, is effective to close normally open shunt contacts 232 and 246 in response to movement thereof by heat generated internally by the bimetal due to the main winding current flowing therethrough and by heater 250. Normally open shunt contacts 232 and 246, upon being closed, are effective to shunt out both heater 250 and bimetal 50. Once start contacts 234 and 66 are open, bimetal element 50 will hunt between a position in which the start contacts 234 and 66 are open and shunt contacts 232 and 246 are open, and a position in which start contacts 234 and 66 are open and normally open shunt contacts 232 and 246 are closed, in a manner similar to that described above for thermal relay 10.

It should be understood that in each of the species thus far described in FIGS. 1–3, 4–6 and in FIGS. 10–14 and 15–18, a heater could be added, if desired, in the manner shown in FIGS. 8 and 9 and described above.

Illustrated in FIGS. 10–14, 23 and 24, is a further embodiment of the thermal relay of the instant invention. Thermal relay 300, as illustrated in FIGS. 10–14, is substantially similar to the thermal relay 10 illustrated in FIGS. 1–3, and includes parts which may be substantially identical with corresponding parts of the relay shown in FIGS. 1–3.

Thermal relay 300 is provided with a casing member 312, a cover member 380, terminals 326, 328 and 330, stationary electrical contacts 332 and 334, switch means or shunt member 340, an electrical contact 346 and an electrically insulating layer 368, each of which are or may be substantially identical to their respective counterparts in thermal relay 10 described above.

Thermal relay 300 is further provided with a thermally responsive member generally indicated at 350 which is somewhat similar to thermally responsive member 50 of thermal relay 10 described above. Thermally responsive member 350 is formed of a conventional thermostatic material such as bimetal, which will be described in greater detail below.

Figure 10:
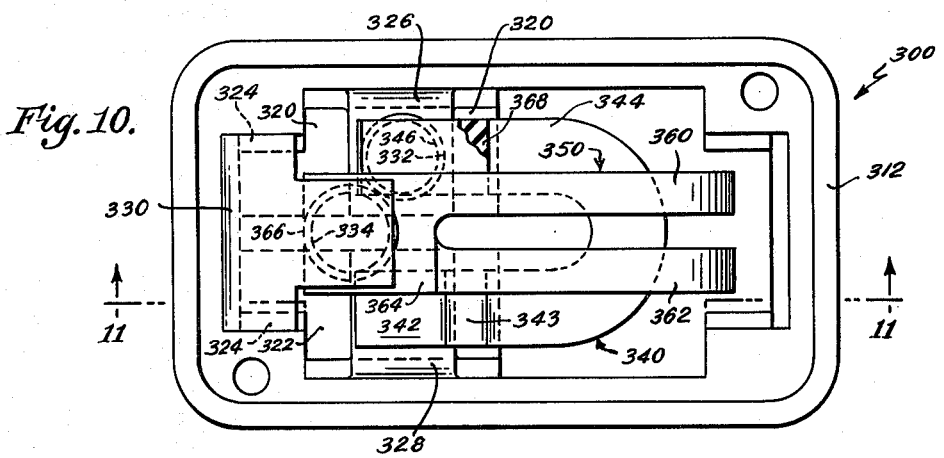
FIG. 10 is a top plan view, with the cover removed, of another thermal relay according to yet a further embodiment of the instant invention.
Figure 11:
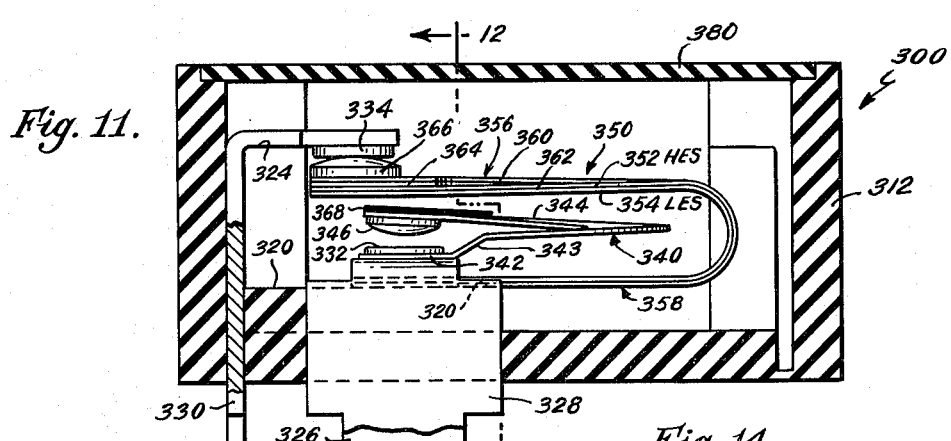
FIG. 11 is a sectional view taken substantially on line 11—11 of FIG. 10.
Figures 12, 13, 14:
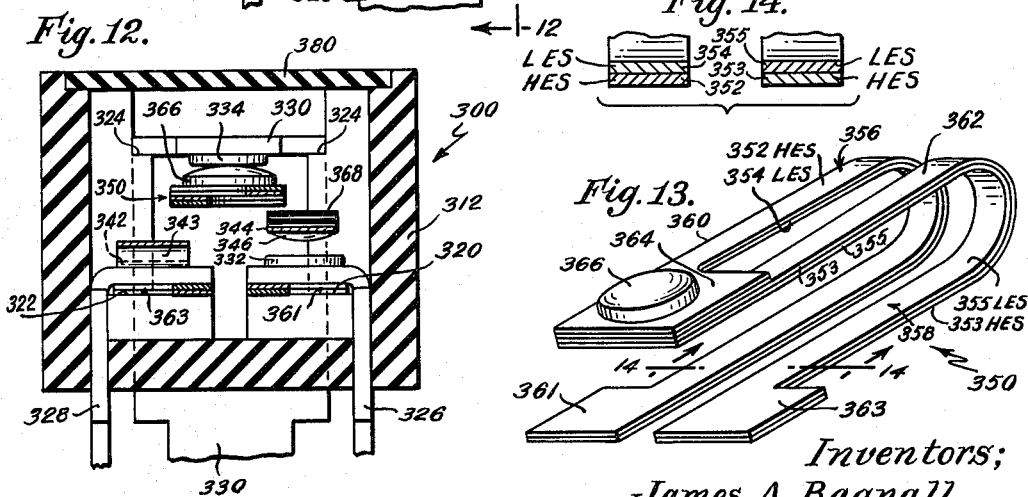
FIG. 12 is a sectional view taken on line 12—12 of FIG. 11.
FIG. 13 is a perspective view of the thermostatic bimetal element of the thermal relay illustrated in FIG. 10.
FIG. 14 is a sectional view taken on line 14—14 of FIG. 11.

Bimetal element 350 is U-shaped in elevation, as seen in FIG. 11, and in perspective in FIG. 13 and includes upper and lower portions generally referred to at 356 and 358. Bimetal element 350 is also substantially U-shaped, as seen in plan view in FIG. 10, and includes legs 360 and 362, as best seen in FIGS. 10 and 13. Legs 360 and 362 are formed separately for a purpose to be described below and are joined together in overlapping relationship at one end (as best seen in FIG. 13) to form an intermediate or bight portion 364. Bight portion 364 mounts electrically conducting contact 366 for engagement with contact 334. Leg 362 is electrically connected at one end 363 to terminal 328 at the lower side thereof and rests on shoulder 322 of casing member 312, as best seen in FIG. 12. One end 361 of leg 360 is electrically connected to terminal 326 with the lower side thereof and rests on shoulder 320 of casing member 312, as best seen in FIG. 12.

Each of legs 360 and 362 may be formed of a conventional bimetal material formed respectively of two layers, 352 and 354 and 353 and 355, of unequal coefficients of thermal expansion with layers 352 and 353 having the higher coefficient of expansion indicated by the reference HES on the drawing. The layers 354 and 355 are the low-expansion sides and are indicated on the drawing by LES. Legs 360 and 362 are formed of thermostatic bimetal of unequal electrical resistance. Leg 360 may have a higher or lower resistance than leg 362, depending upon which of the two circuits, as shown in FIGS. 23 and 24, is employed and will be discussed in greater detail below.

Referring now to the circuit diagrams of FIGS. 23 and 24, the thermal relay 300 is schematically illustrated in a circuit with a motor having an auxiliary or phase winding 370 and a main winding 372.

Referring now specifically to FIG. 23, terminal 326 of thermal relay 300 is electrically connected to $L_{14}$, one side of a power source. Terminal 330 is electrically connected in series with start or phase winding 370 and terminal 328 is electrically connected in series with main winding 372. Normally closed start contacts 334 and 366 are electrically connected in series with start winding 370 through terminal 330. Legs 360 and 362 of bimetal member 350 are connected in series with the main winding 372 through terminal 228 and normally open shunt contacts 332 and 346 are connected in shunt across legs 360 and 362 of bimetal member 350 and thus shunt contacts 332 and 346 are also connected in series with the main winding 372 through terminal 328. As shown in FIG. 23, the bimetal element 350 carries both the start and main winding current. When the start contacts 334 and 366 are closed, leg 360 of bimetal element 350 carries both the start and main winding currents and leg 362 carries only the main winding current. When start contacts 334 and 366 are separated and shunt contacts 332 and 346 are open, both legs 362 and 360 of the bimetal element 350 will carry the main winding or line current. The fact that legs 362 and 360 carry unequal current when the start contacts are closed may create a problem which will be discussed more fully below.

Referring now to FIG. 24, terminal 328 is electrically connected to $L_{16}$, one side of a power source. Terminal 330 is connected in series with start winding 370 and terminal 362 is connected in series with main winding 372.

In the circuit of FIG. 24, when the start contacts 334 and 366 are closed, bimetal element 350 carries both the main and start winding currents as in the circuit of FIG. 23, but with leg 362 of bimetal element 350 carrying both the start and main winding currents and leg 360 carrying only the main winding current. Legs 360 and 362 of bimetal member 350 are connected in series with main winding 372 through terminal 326 and shunting contacts 332 and 346 are connected in shunt across legs 360 and 362 and thus shunt contacts 332 and 346 are also connected in series with main winding 372 through terminal 326. Normally closed contacts 334 and 366 are electrically connected in series with the start winding 370 through terminal 330. The operation of the thermal relay 300 in each of these circuits is substantially the same as that described above for thermal relay 10, except as noted below.

Since the leg of the bimetal connected in the line side carries both the start and main winding currents when the start contacts are closed, and the other leg carries only the main winding current (respectively, legs 360 and 362 in the circuit of FIG. 23 and legs 362 and 360 in the circuit of FIG. 24), there is unequal heating in the legs when the electrical resistance is the same in both legs. Such unequal heating may tend to produce undesirable results in that the leg which is heated the most will tend to move in a direction to open the start contacts while the other leg, which is cooler, will tend to prevent such movement, with the result that a twisting action may be created and hinder a quick break of the start contacts. Other disadvantages which may result from unequal heating in legs 360 and 362 is the possible formation of localized hot spots which could cause burnout of the thermal element 350, the creation of stress concentrations, and possible laminar separations. By varying the resistances in each of the legs in accordance with the difference in current flowing therethrough, it is possible to achieve uniform heating throughout the entire bimetal element when the start contacts are closed and thus obviate and preclude the possible disadvantageous results and problems described above.

Referring now to FIG. 23 wherein leg 360 carries both the start and main winding currents when start contacts 334 and 366 are closed, and leg 362 carries only the main winding current, leg 360 would be constructed so as to have a correspondingly lower electrical resistance than that of leg 362.

In FIG. 24 wherein leg 362 carries the higher current, namely; both the start and main winding current, and leg 360 carries only the main winding current when the start contacts 334 and 366 are closed, leg 362 would then be constructed so as to have a correspondingly lower electrical resistance than that of leg 360 so as to provide for uniform heating in both legs 360 and 362. Thermal element 350, as illustrated, is constructed of two legs, 360 and 362 which have different electrical resistances provided by differing compositions of the bimetal. An integral bimetal element, such as that shown in FIG. 7, could also be employed wherein both legs are formed of the same composition of bimetal and the resistance in each of the legs varies by proportionally widening one leg and narrowing the other so as to achieve the desired difference in electrical resistances to effect uniform heating throughout the bimetal element. It should be understood that there may be numerous other ways within the scope of the invention as disclosed to achieve this differential resistance in each of the legs and the particular means of achieving the differential resistance in each of the legs set forth above are merely by way of example and not limitation.

Thermal relay 300 additionally provides substantially all the unusual and advantageous beneficial results described above for thermal relay 10.

Figure 15:
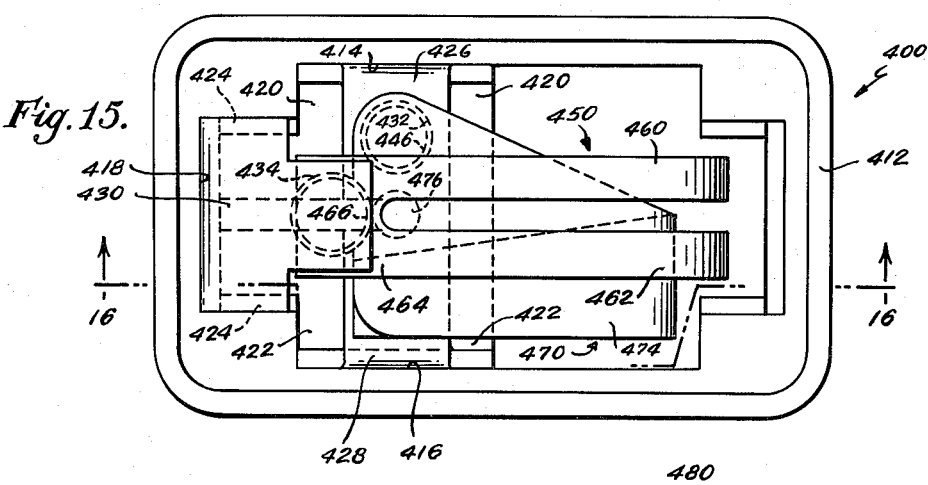
FIG. 15 is a top plan view, with cover removed, of another thermal relay according to yet a further embodiment of the instant invention.
Figure 16:
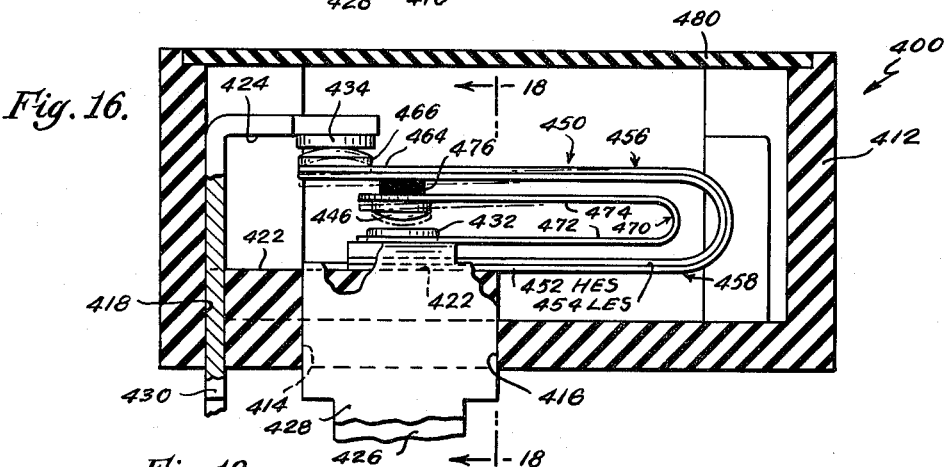
FIG. 16 is a sectional view taken substantially on line 16—16 of FIG. 15.
Figure 18:
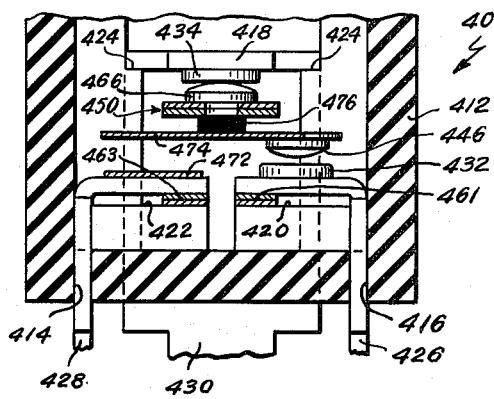
FIG. 18 is a sectional view taken on line 18—18 of FIG. 16.
Figure 17:
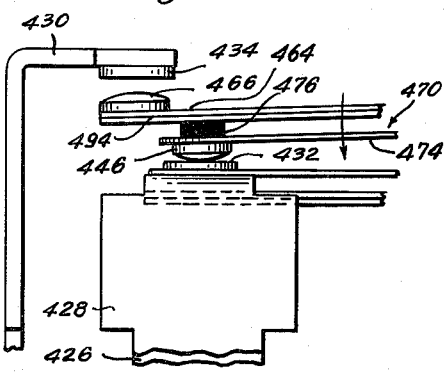
FIG. 17 is a fragmentary, elevational view taken from FIG. 16 indicating relative movement between parts.

Illustrated in FIGS. 15–18 is yet another embodiment of the thermal relay of the instant invention. Thermal relay 400, as illustrated in FIGS. 15–18, is similar to the thermal relay illustrated in FIGS. 1–3 and includes parts which may be substantially identical with corresponding parts of the thermal relay shown in FIGS. 1–3. In this regard, a numeral of the 400 series refers to a part substantially identical to a part in the FIGS. 1–3 embodiment which has a reference numeral corresponding to the last two digits of the particular 400 series number, except as pointed out hereinafter. It will be understood that the broken-away portions of the thermal relay, as shown in FIG. 18, is or may be of the same form as that of the portions included in the thermal relay shown in FIG. 2. Thermal relay 400 is provided with a casing 412, a cover member 480, terminals 426, 428 and 430 mounted respectively in slots 414, 416 and 418 and shoulders 420, 422 and 424 adjacent thereto provided by casing member 412. Terminal 426 is provided with an electrical contact 432 and terminal 430 is provided with an electrical contact 434 as shown. Thermal relay 400 is further provided with a thermally responsive member generally referred to at 450 which has substantially the same shape as thermal element 50 of thermal relay 10 and is electrically connected at one end of each of legs 460 and 462, respectively, to terminals 426 and 428. Thermal element 450 further has mounted thereon an electrical contact 466 for engagement with contact 434. The thermal relay 400 as thus far described is or may be substantially identical to its respective counterparts in thermal relay 10. Thermal relay 400 differs from thermal relay 10 mainly in the shunt or switch means generally referred to at 470. Shunt means 470 is U-shaped in elevation, as best seen in FIG. 16, and includes a lower leg 472 and an upper leg 474. Lower leg 472 is electrically connected at its end to terminal 428, as best seen in FIGS. 15, 17 and 18. Upper leg 474 has mounted at one end thereof on its lower surface electrical contact 446 for engagement with contact 432 and spring biases contact 446 normally out of engagement with contact 432. An abutment member 476 is secured to the upper surface of leg 474 substantially in the area adjacent contact 446. Abutment 476 is formed of an electrically insulating material such as, for example, nylon or Teflon (the latter being a registered trademark of E. I. du Pont de Nemours & Co. for a plastic consisting of a tetrafluoroethylene polymer). Abutment 476 is adapted to be engaged by the lower surface of the intermediate portion 464 of thermal element 450 to move the shunt means 470 in response to movement of the thermal element 450 to shunt out the thermal element 450 in the manner described above with respect to thermal relay 10. Abutment member 476, in addition to serving the function of insulating the two portions of the thermally responsive member 450 and the shunt means 470, which would be engaged, also serves as a positive motion-translating member and localizes the area of contact between the shunt means 470 and the thermally responsive member 450. Thermal relay 400 additionally provides all of the unusual and beneficial advantageous results described above with regard to thermal relay 10. Thermal relay 400 may be employed in the same circuits as that illustrated above in FIGS. 19 and 20 for thermal relay 10.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A control device for an electric motor having a main and a phase winding, comprising a base, three electrical terminals, mounted on the base; a pair of normally closed electrical contacts and a pair of normally opened electrical contacts, one of said normally closed contacts being mounted on and electrically connected to a first one of said terminals; a substantially U-shaped electrically conducting thermally responsive member carrying the other of said normally closed contacts adjacent one end of one of the legs thereof for movement into and out of engagement with said one of said normally closed contacts; an electrically conducting switch member, adjacent one end thereof, being electrically connected to a second one of said terminals; one of said normally open electrical contacts being mounted on and electrically connected to the third one of said terminals; the other of said normally open electrical contacts being carried by said switch member, adjacent the other end thereof, for movement into and out of engagement with said one of said normally open contacts, said electrically conducting thermally responsive member having spaced portions, adjacent the other end thereof, respectively electrically connected to and mounted on said second and third terminals, said one leg of said thermally responsive member overlying said switch member and being movable relative to and there against upon movement of said thermally responsive member in a direction toward said switch member when the thermally responsive member is heated by one predetermined current flow condition to open said normally closed contacts, and to thereafter close said normally open contacts to shunt out the thermally responsive member in response to further movement thereof in said direction by another predetermined current flow condition.

2. The combination as set forth in claim 1 and having heater means for said thermally responsive member electrically connected therewith.

3. The device as set forth in claim 1 and wherein said electrically conductive switch member comprises a U-shaped element with a portion of one of the legs thereof electrically connected to said second terminal and the other leg thereof mounting said other of said normally open contacts and biasing said last-named contact to a contacts-open position, said other of said legs of said U-shaped element being engageable by said one leg of said U-shaped member thermally responsive member to close said normally open contacts at said another predetermined current flow condition.

4. The control as set forth in claim 1 and including means electrically insulating said switch member from said one leg of said thermally responsive member.

5. The combination as set forth in claim 4 and wherein said electrically insulating means comprises an abutment formed of electrically insulating material mounted on said switch member.

References Cited by the Examiner

UNITED STATES PATENTS

| | | | |
|---|---|---|---|
| 1,755,564 | 4/30 | Shoenberg | 200—115.5 |
| 2,105,005 | 1/38 | Pearce | 317—13 |
| 2,117,123 | 5/38 | Werner | 317—40 |
| 2,225,975 | 12/40 | Bruce | 200—122 |
| 2,280,960 | 4/42 | Lee | 200—113 |
| 2,284,383 | 5/42 | Elmer | 200—113 |
| 2,367,985 | 1/45 | Weeks | 317—40 |
| 2,381,557 | 8/45 | Ray | 200—138 |
| 2,417,912 | 3/47 | Clark | 317—13 |
| 2,496,135 | 1/50 | Sedwitz | 200—138 |
| 2,692,930 | 10/54 | Dillman | 200—138 |
| 2,805,302 | 9/57 | Reis | 200—138 |

FOREIGN PATENTS 1,063,252  4/54  France.

BERNARD A. GILHEANY, *Primary Examiner.*
SAMUEL BERNSTEIN, *Examiner.*